G. W. TIBBITS.
TRANSMISSION MECHANISM.
APPLICATION FILED OCT. 4, 1913.

1,134,981.

Patented Apr. 6, 1915.

Witnesses:

Inventor:
George W. Tibbits,

UNITED STATES PATENT OFFICE.

GEORGE W. TIBBITS, OF LOS ANGELES, CALIFORNIA.

TRANSMISSION MECHANISM.

1,134,981. Specification of Letters Patent. Patented Apr. 6, 1915.

Application filed October 4, 1913. Serial No. 793,456.

*To all whom it may concern:*

Be it known that I, GEORGE W. TIBBITS, a citizen of the United States, residing at Los Angeles, in the county of Los Angeles and State of California, have invented a certain new and useful Transmission Mechanism, of which the following is a specification.

My invention relates to a variable speed transmission for self-propelled vehicles, and has for its object to provide a light and simple transmission in which the gears are always in mesh and in which the high and low speeds may be controlled by foot movement.

Other objects will appear from the following specification in connection with the accompanying drawing, in which—

Figure 1:
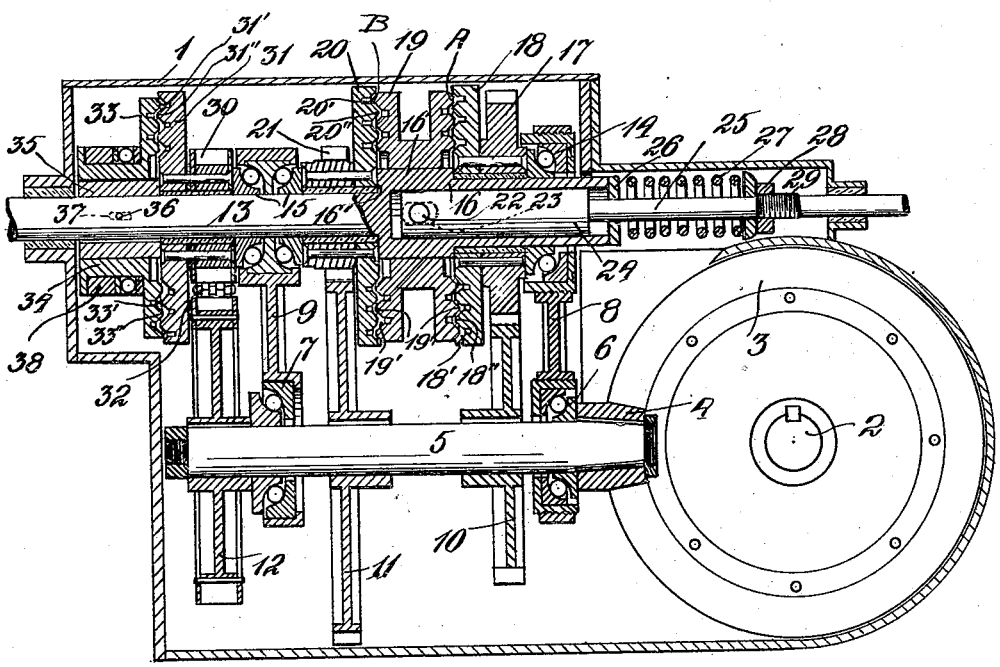
Figure 2:
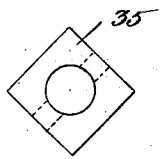
Figure 3:
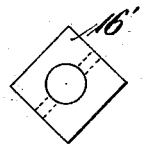

Figure 1 is a vertical section illustrating the transmission mechanism. Fig. 2, is a detail showing the squared portion of the driving shaft, and Fig. 3, is a detail showing the squared collar mounted on the driving shaft.

Referring to the drawing, 1, designates a case; 2 is an axle having keyed thereon a bevel gear 3, with which a bevel pinion 4, keyed on a driven shaft 5, is in mesh. Said driven shaft 5, is suitably supported within said case 1, in bearings 6 and 7, which are carried by ribs or spiders 8 and 9, integral with the case. On said driven shaft are keyed gears 10 and 11, and a toothed wheel 12, for high and low speeds, and for reverse, respectively. 13 is a driving shaft mounted in suitable bearings 14 and 15, carried by said ribs or spiders 8 and 9, said driving shaft having an enlarged hollow portion 16, for purposes to appear presently, said enlarged hollow portion being squared on the outside for a short distance, as seen at 16′, and the balance of the enlarged portion of the shaft being annular. Loosely mounted on the annular portion of said shaft 13, is a gear 17, in mesh with said gear 10, and rigidly secured to a friction disk 18, also loosely mounted on the annular portion of said shaft. Said friction disk 18, is provided with annular V-shaped grooves 18′, and ridges 18″. Mounted on the said squared portion 16′ of said shaft 13, is a friction clutch 19, having two friction faces A and B, each provided with annular V-shaped grooves 19′ and ridges 19″, the face A being arranged to be moved, by means presently described, in frictional engagement with said friction disk 18, whereby to transmit power from said shaft 13, through gears 17 and 10, to the driven shaft 5; and said face B being arranged to be moved in frictional engagement with a friction disk 20, provided with annular V-shaped grooves 20′ and ridges 20″, and loosely mounted on said shaft 13. Rigidly connected with said friction disk 20, is a gear 21, which is always in mesh with the gear 11, on the driven shaft.

The friction clutch 19, referred to, being mounted on the squared portion 16′ of said shaft, is rotatable therewith, and is capable of longitudinal movement thereon, a pin 22 extending through an elongated slot 23, in said enlarged squared portion 16′, of said shaft 13, connecting said clutch with a shifting plunger 24, disposed and operable within the hollow portion of said shaft, to shift the clutch on the shaft and thereby cause the faces A and B to frictionally engage with the friction disks 18 and 20, respectively. On the plunger 24, is a stem 25, which extends through a cap 26, closing the end of the hollow portion of the shaft, and through the case 1, to an operating mechanism, not shown. About said stem is coiled a spring 27, which abutting against said cap 26, and a tension adjusting nut 28, operable on the threaded portion 29, of said stem 25, is provided to normally hold the clutch 19, in engagement with the friction disk 18, of said high speed gear 17. Loosely mounted on said shaft 13, is a toothed wheel 30, and a friction disk 31, provided with annular grooves 31′ and ridges 31″, the disk being bound with said toothed wheel 30 by any suitable means. Said toothed wheel 30, is connected with said toothed wheel 12, on said driven shaft 5, by a chain 32. Arranged for engagement with the annular grooves and ridges of the said friction disk 31, to transmit motion thereto and to said toothed wheels 30 and 12, is a friction clutch 33, provided with annular V-shaped grooves 33′ and ridges 33″. Integral with said clutch 33, is a hub 34, which fits over a squared sleeve 35, keyed to said shaft 13. This friction clutch 33, is slidable longitudinally on said squared sleeve 35, a pin 36, extending through a slot 37, in said sleeve connecting said friction clutch with said shaft 13. A shifter 38, on the hub 34, of said friction clutch serves to move the friction clutch 33 in and out of engagement with said friction disk 31.

What I claim, is:—

1. A driven shaft, variable speed gears keyed thereon, a driving shaft having an enlarged hollow portion, a high speed gear loose on said enlarged portion of said driving shaft and in mesh with one of the gears on said driven shaft, a clutch disk connected with said high speed gear, a low speed gear loose on said driving shaft in mesh with another of the gears on said driven shaft, a clutch disk connected with said low speed gear, a two faced clutch disk on said enlarged portion of said driving shaft and between the clutch disks of said high and low speed gears, a means extending through said hollow portion of said driving shaft and connected with said two faced clutch disk to shift same thereon, a toothed wheel keyed on said driven shaft, a toothed wheel loose on said driving shaft, a chain connecting said toothed wheels, a disk clutch connected with the toothed wheel on said driving shaft, a disk clutch keyed on said driving shaft and shiftable to engage the clutch on said toothed wheel, and means to operate said clutch.

2. A driven shaft, variable speed gears keyed thereon, a driving shaft having an enlarged hollow portion, a high speed gear loose on the enlarged portion of said shaft and in mesh with one of the gears on said driven shaft, a clutch disk connected with said high speed gear, a low speed gear loose on said driving shaft in mesh with another of the gears on said driven shaft, a clutch disk connected with said low speed gear, a two faced clutch disk on said enlarged portion of said shaft and between the clutch disks of said high and low speed gears, a plunger extending through said enlarged portion to move said two faced clutch thereon, a toothed wheel keyed on said driven shaft, a toothed wheel loose on said driving shaft, a chain connecting said toothed wheels, a disk clutch connected with the toothed wheel on said driving shaft, a disk keyed on said driving shaft to engage the clutch on said toothed wheel, and means to operate said disk.

3. A driven shaft, variable speed gears keyed thereon, a driving shaft having an enlarged hollow portion, a high speed gear loose on said driving shaft and in mesh with one of the gears on said driven shaft, a clutch disk connected with said high speed gear, a low speed gear loose on said driving shaft in mesh with another of said gears on said driven shaft, a clutch disk connected with said low speed gear, a two faced clutch disk on said enlarged portion of said shaft and between the clutch disks of said high and low speed gears, a plunger extending through said enlarged portion to move said two faced clutch thereon, a spring engaging said plunger to cause said two faced clutch to be held in engagement with the friction disk of said high speed gear, a toothed wheel keyed on said driven shaft, a toothed wheel loose on said driving shaft, a chain connecting said toothed wheels, a disk clutch connected with the toothed wheel on said driving shaft, a disk keyed on said driving shaft to engage the clutch on said toothed wheel, and means to operate said disk.

In testimony whereof I have set my hand in the presence of two witnesses.

GEORGE W. TIBBITS.

Witnesses:
ANTON GLOETZNER, Jr.,
E. L. STILWELL.

Copies of this patent may be obtained for five cents each, by addressing the "Commissioner of Patents, Washington, D. C."